US011631333B2

(12) United States Patent
Wang et al.

(10) Patent No.: US 11,631,333 B2
(45) Date of Patent: Apr. 18, 2023

(54) MULTI-AGENT REINFORCEMENT LEARNING FOR ORDER-DISPATCHING VIA ORDER-VEHICLE DISTRIBUTION MATCHING

(71) Applicant: Beijing DiDi Infinity Technology and Development Co., Ltd., Beijing (CN)

(72) Inventors: Chenxi Wang, Lynnwood, WA (US); Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 628 days.

(21) Appl. No.: 16/720,544

(22) Filed: Dec. 19, 2019

(65) Prior Publication Data
US 2020/0273346 A1    Aug. 27, 2020

Related U.S. Application Data

(60) Provisional application No. 62/810,860, filed on Feb. 26, 2019.

(51) Int. Cl.
*G08G 1/00* (2006.01)
*G06N 20/00* (2019.01)
(Continued)

(52) U.S. Cl.
CPC .............. *G08G 1/202* (2013.01); *G06N 20/00* (2019.01); *G06N 20/20* (2019.01); *G06Q 10/02* (2013.01);
(Continued)

(58) Field of Classification Search
CPC ........ G08G 1/202; G06N 20/00; G06N 20/20; G06Q 10/02; G06Q 10/047; G06Q 10/08355
See application file for complete search history.

(56) References Cited

U.S. PATENT DOCUMENTS 8,442,848 B2    5/2013 Myr
10,837,788 B1 *  11/2020 Kentley-Klay .... G01C 21/3438
(Continued)

FOREIGN PATENT DOCUMENTS

AU    2008202871 A1 *  1/2010 ........... G01C 21/343
CN       102394009 A      3/2012
(Continued)

OTHER PUBLICATIONS

Caroline Claus and Craig Boutilier, "The Dynamics of Reinforcement Learning in Cooperative Multiagent Systems", AAAI-98 Proceedings, published 1998, rerieved from URL https://www.aaai.org/Papers/AAAI/1998/AAAI98-106.pdf (Year: 1998).*

(Continued)

*Primary Examiner* — Calvin Cheung

(74) *Attorney, Agent, or Firm* — Sheppard Mullin Richter & Hampton LLP

(57) ABSTRACT

Multi-agent reinforcement learning may be used for rider order-dispatching via matching the distribution of orders and vehicles. Information may be obtained. The information may include a plurality of vehicle locations of a plurality of vehicles, a plurality of ride orders, and a current time. The obtained information may be input into a trained model. The trained model may be based on Kullback-Leibler divergence optimization and independent agents under a guidance of a joint policy. A plurality of order-dispatching tasks may be generated for the plurality of vehicles to fulfill.

19 Claims, 6 Drawing Sheets

(51) Int. Cl.
G06Q 10/047 (2023.01)
G06Q 10/0835 (2023.01)
G06N 20/20 (2019.01)
G06Q 10/02 (2012.01)

(52) U.S. Cl.
CPC ..... *G06Q 10/047* (2013.01); *G06Q 10/08355* (2013.01)

(56) References Cited

U.S. PATENT DOCUMENTS

| | | | |
|---|---|---|---|
| 2002/0077876 | A1 | 6/2002 | O'Meara et al. |
| 2009/0234783 | A1* | 9/2009 | Hamagami ............ G06N 20/00 706/12 |
| 2009/0327011 | A1* | 12/2009 | Petroff ................. G01C 21/343 705/5 |
| 2011/0099040 | A1 | 4/2011 | Felt et al. |
| 2011/0246246 | A1 | 10/2011 | Johnson |
| 2012/0290652 | A1 | 11/2012 | Boskovic |
| 2015/0081362 | A1 | 3/2015 | Chadwick et al. |
| 2015/0100530 | A1* | 4/2015 | Mnih ...................... A63F 13/67 706/25 |
| 2016/0026936 | A1 | 1/2016 | Richardson et al. |
| 2016/0320195 | A1 | 11/2016 | Liu et al. |
| 2016/0364678 | A1 | 12/2016 | Cao |
| 2017/0091891 | A1 | 3/2017 | Van Der Berg |
| 2017/0365030 | A1 | 12/2017 | Shoham et al. |
| 2018/0165603 | A1* | 6/2018 | Van Seijen .......... G06N 3/0454 |
| 2018/0276351 | A1* | 9/2018 | Patton ................ G06F 21/6218 |
| 2018/0315146 | A1* | 11/2018 | Matthiesen ........ G01C 21/3453 |
| 2018/0357893 | A1 | 12/2018 | Dong et al. |
| 2018/0376357 | A1 | 12/2018 | Coutinho et al. |
| 2020/0033868 | A1* | 1/2020 | Palanisamy .......... G05D 1/0221 |
| 2020/0098075 | A1* | 3/2020 | Murati ................... G06Q 50/30 |
| 2020/0193333 | A1* | 6/2020 | Iwane .................... G06N 20/00 |
| 2020/0233384 | A1* | 7/2020 | Iwane .................... G06N 3/006 |

FOREIGN PATENT DOCUMENTS

| | | |
|---|---|---|
| CN | 103868692 A | 6/2014 |
| WO | 2018/125989 A2 | 7/2018 |

OTHER PUBLICATIONS

PCT/US2020/019414 Written Opinion of the International Search Authority, dated May 22, 2020. (Year: 2020).*
Zhaodong Wang, Zhiwei (Tony) Qin, Xiaocheng Tang, Jieping Ye, Hongtu Zhu, "Deep Reinforcement Learning with Knowledge Transfer for Online Rides Order Dispatching"; IEEE website, published 2018, retrieved from URL https://ieeexplore.ieee.org/stamp/stamp.jsp?tp=&arnumber=8594886 (Year: 2018).*
Aamena Alshamsi et al., "Multiagent self-organization for a taxi dispatch system. In 8th international conference on autonomous agents and multiagent systems", 2009, pp. 21-28.
Darse Billings et al., "Opponent Modeling in Poker", Aaai/iaai, 1998, pp. 493:499.
Lucian Busoniu et al., "Multi-agent reinforcement learning: A survey", In Control, Automation, Robotics and Vision, 2006. ICARCV'06. 9th International Conference on, IEEE, pp. 1-6.
Jakob Foerster et al., "Learning to communicate with deep multi-agent reinforcement learning", Advances in Neura Information Processing Systems, 2016, pp. 2137-2145.
Jakob N. Foerster et al., "Learning to communicate to solve riddles with deep distributed recurrent q-networks", arXiv preprint arXiv:1602 02672, 2016.
Jayesh K. Gupta et al., "Cooperative multi-agent control using deep reinforcement learning", International Conference on Autonomous Agents and Multiagent Systems, Springer, 2017, pp. 66-83.
Matthew John Hausknecht, "Cooperation and communication in multiagent deep reinforcement learning", PhD thesis, 2016.
Junling Hu et al., "Multiagent reinforcement learning: theoretical framework and an algorithm", ICML, vol. 98, Citeseer, 1998, pp. 242-250.
Der-Horng Lee et al., "Taxi dispatch system based on current demands and real-time traffic conditions", Transportation Research Record: Journal of the Transportation Research Board, (1882):193-200, 2004.
Bin Li et al., "Hunting or waiting? discovering passenger-finding strategies from a large-scale real-world taxi dataset", Pervasive Computing and Communications Workshops (PERCOM Workshops), 2011 IEEE International Conference on, pp. 63-68. IEEE, 2011.
Kevin Frans et al., "Meta learning shared hierarchies", arXiv:1710.09767v1 [cs.LG] Oct. 26, 2017.
Minne Li et al., "Efficient ridesharing order dispatching with mean field multi-agent reinforcement learning", arXiv preprint arXiv:1901.11454, 2019.
Ziqi Liao, "Taxi dispatching via global positioning systems". IEEE Transactions on Engineering Management, 48(3):342-347, 2001.
Ziqi Liao, "Real-time taxi dispatching using global positioning systems", Communications of the ACM, 46(5):81-83, 2003.
Kaixiang Lin et al., "Efficient large-scale fleet management via multi-agent deep reinforcement learning", arXiv preprint arXiv:1802.06444, 2018.
Ryan Lowe et al., "Multi-agent actor-critic for mixed cooperative-competitive environments", Advances in Neural Information Processing Systems, 2017, pp. 6379-6390.
Gary S. Lynch, "Single point of failure: The 10 essential laws of supply chain risk management", John Wiley & Sons, 2009.
Fei Miao et al., "Taxi dispatch with real-time sensing data in metropolitan areas: A receding horizon control approach", IEEE Transactions on Automation Science and Engineering, 13(2):463-478, 2016.
Volodymyr Mnih et al., "Human-level control through deep reinforcement learning", Nature, 518(7540):529, 2015.
Igor Mordatch et al., "Emergence of grounded compositional language in multi-agent populations", arXiv preprint arXiv:1703.04908, 2017.
James Munkres, "Algorithms for the assignment and transportation problems", Journal of the society for industrial and applied mathematics, 5(1):32-38, 1957.
Takuma Oda et al., "Distributed fleet control with maximum entropy deep reinforcement learning", 2018.
Christos H. Papadimitriou et al., "Combinatorial optimization: algorithms and complexity", Courier Corporation, 1998.
Frederik Schadd et al., "Opponent modeling in real-time strategy games", GAMEON, 2007, pp. 61-70.
Kiam Tian Seow et al., "A collaborative multiagent taxi-dispatch system", IEEE Transactions on Automation Science and Engineering, 7(3):607-616, 2010.
Lloyd S. Shapley, "Stochastic games", Proceedings of the National Academy of Sciences, 39(10):1095-1100, 1953.
Matthijs TJ Spaan, "Partially observable markov decision processes", In Reinforcement Learning, Springer, 2012, pp. 387-414.
Sainbayar Sukhbaatar et al., "Learning multiagent communication with backpropagation", Advances in Neural Information Processing Systems, 2016, pp. 2244-2252.
Gerald Tesauro, "Extending Q-learning to General Adaptive Multi-agent Systems", Advances in Neural Information Processing Systems, 2004, pp. 871-878.
Yongxin Tong et al., "A unified approach to route planning for shared mobility", Proceedings of the VLDB Endowment, 11(11):1633-1646, 2018.
Hado Van Hasselt et al., "Deep reinforcement learning with double q-learning", AAAI, vol. 2, Phoenix, AZ, 2016, p. 5.
Zhaodong Wang et al., "Deep reinforcement learning with knowledge transfer for online rides order dispatching", 2018 IEEE International Conference on Data Mining (ICDM), pp. 617-626. IEEE, 2018.
Zheng Wang et al., "Learning to estimate the travel time", Proceedings of the 24th ACM SIGKDD International Conference on Knowledge Discovery & Data Mining, pp. 858-866. ACM, 2018.

(56) References Cited

OTHER PUBLICATIONS

Chong Wei et al., "Look-ahead insertion policy for a shared-taxi system based on reinforcement learning", IEEE Access, 6:5716-5726, 2018.
Zhe Xu et al., "Large-scale order dispatch in on-demand ride-hailing platforms: A learning and planning approach", Proceedings of the 24th ACM SIGKDD International Conference on Knowledge Discovery & Data Mining, ACM, 2018, pp. 905-913.
Yaodong Yang et al., "Mean field multi-agent reinforcement learning", arXiv preprint arXiv: 1802.05438, 2018.
Lingyu Zhang et al., "A taxi order dispatch model based on combinatorial optimization", Proceedings of the 23rd ACM SIGKDD International Conference on Knowledge Discovery and Data Mining, pp. 2151-2159. ACM, 2017.
Lianmin Zheng et al., "Magent: A many-agent reinforcement learning platform for artificial collective intelligence", NIPS Demo, 2017.
Niels Agatz et al., "Optimization for dynamic ride-sharing: A review", European Journal of Operational Research, 223 (2):295-303, 2012.
Christoph Stach, "Saving time, money and the environment-vhike a dynamic ride-sharing service for mobile devices", Pervasive Computing and Communications Workshops (PERCOM Workshops), 2011 IEEE International Conference on, pp. 352-355. IEEE, 2011.
Richard S. Sutton et al., "Reinforcement Learning: An Introduction", MIT Press, Second Edition, 2018.
Sanjeevan Ahilan et al., "Feudal multi-agent hierarchies for cooperative reinforcement learning", arXiv:1901.08492v1 [cs.MA], Jan. 24, 2019.
Pierre-Luc Bacon et al., "The option-critic architecture", AAAI, 2017, arXiv: 1609.05140v2 [cs.AI] Dec. 3, 2016.
Richard Bellman, "Dynamic Programming", Courier Corporation, 2013.
Nuttapong Chentanez et al., "Intrinsically motivated reinforcement learning", NeurIPS, 2005.
Christian Daniel et al., "Hierarchical relative entropy policy search", Proceedings of the 15th International Conference an Artificial Intelligence and Statistics (AISTATS), Artificial Intelligence and Statistics, 2012, pp. 273-281.
Peter Dayan et al., "Feudal reinforcement learning", NeurIPS, 1993.
Thomas G. Dietterich, "Hierarchical reinforcement learning with the maxq value function decomposition", Journal of Artificial Intelligence Research, vol. 13, 2000, pp. 227-303.
Darios Florensa et al., "Stochastic neural networks for hierarchical reinforcement learning", arXiv:1704.03012v1 [cs.AI], Apr. 10, 2017.
Non-Final Office Action dated Nov. 22, 2021, issued in related U.S. Appl. No. 16/720,676 (7 pages).
PCT International Preliminary Reporton Patentability dated Sep. 10, 2021, issued in related International Application No. PCT/US2020/019414 (8 pages).
PCT International Preliminary Report on Patentability dated Sep. 10, 2021, issued in related International Application No. PCT/US2020/019417 (6 pages).
Gianpaolo Ghiani et al., "Real-time vehicle routing: Solution concepts, algorithms and parallel computing strategies", European Journal of Operational Research, vol. 151, 2003, pp. 1-11.
Xiangyu Kong et al., "Revisiting the Master-Slave Architecture in Multi-Agent Deep Reinforcement Learning", arXiv:1712.07305v1, Dec. 20, 2017, pp. 1-14.
Tejas D. Kulkarni et al., "Hierarchical deep reinforcement learning: Integrating temporal abstraction and intrinsic motivation", arXiv:1604.06057v2 [cs.LG], May 31, 2016.
Timothy P. Lillicrap et al., "Continuous control with deep reinforcement learning", arXiv:1509.02971v6 [cs.LG], Jul. 5, 2019.
Dominique Lord et al., "Poisson, poisson-gamma and zero-inflated regression models of motor vehicle crashes balancing statistical fit and theory", Accident Analysis & Prevention, 83rd Annual Meeting of Transportation Research Board, Apr. 21, 2004.
Volodymyr Mnih et al., "Playing atari with deep reinforcement learning", arXiv:1312.5602v1 [cs.LG], Dec. 19, 2013.
Ofir Nachum et al., "Data-efficient hierarchical reinforcement learning", arXiv:1805.08296v4 [cs.LG], Oct. 5, 2018.
Doina Precup, "Temporal abstraction in reinforcement learning", Dissertation submitted to the Graduate School of the University of Massachusetts Amherst, May 2000.
Martin Riedmiller, "Learning by playing-solving sparse reward tasks from scratch", arXiv:1802.10567v1 [cs.LG], Feb. 28, 2018.
Olivier Sigaud et al., "Policy search in continuous action domains: an overview", arXiv:1803.04706v5 [cs.LG], Jun. 13, 2019.
Hugo P. Simao et al., "An approximate dynamic programming algorithm for large-scale fleet management: A case application", Transportation Science, Articles in Advance, 2009, pp. 1-20.
Martin Stolle et al., "Learning Options in Reinforcement Learning", International Symposium on Abstraction, Reformulation, and Approximation, 2002.
Richard S. Sutton et al., "Between MDPs and semi-MDPs: A framework for temporal abstraction in reinforcement earning", Artificial Intelligence, vol. 112, 1999, pp. 181-211.
Chen Tessler et al., "A deep hierarchical approach to lifelong learning in minecraft", AAAI, 2017, arXiv:1604.07255V3 [cs.AI] Nov. 30, 2016.
Ashish Vaswani et al., "Attention is all you need", arXiv:1706.03762v5 [cs.CL], Dec. 6, 2017.
Petar Velickovic et al., "Graph Attention Networks", arXiv:1710.10903v3 [stat.ML], Feb. 4, 2018.
Alexander Sasha Vezhnevets et al. "FeUdal networks for hierarchical reinforcement learning", arXiv:1703.01161v2 [cs.AI] Mar. 6, 2017.
Xiangyu Zhao et al., "Deep reinforcement learning for list-wise recommendations", arXiv:1801.00209v3 [cs.LG] Jun. 27, 2019.
Qingnan Zou et al., "A novel taxi dispatch system for smart city", International Conference on Distributed, Ambient, and Pervasive Interactions, 2013.
PCT International Search Report and the Written Opinion dated May 22, 2020, issued in related International Application No. PCT/US2020/019414 (9 pages).
Caroline Claus et al. "The Dynamics of Reinforcement Learning in Cooperative Multiagent Systems", AAAI-98 Proceedings Dec. 31, 1998 (Dec. 31, 1998) [retrieved on Apr. 29, 2020].
Kaixiang Lin et al. "Efficient Large-Scale Fleet Management via Multi-Agent Deep Reinforcement Learning", KDD 2018, research track paper. Aug. 19-23, 2018 (Aug. 23, 2018) [retrieved on Apr. 29, 2020].
Ermo Wei et al. "Multiagent Soft Q-Learning", The 2018 AAAI Spring Symposium Series, 2018, pp. 351-357.
PCT International Search Report and the Written Opinion dated May 22, 2020, issued in related International Application No. PCT/US2020/019417 (7 pages).
First Office Action and Search Report dated Sep. 1, 2022, issued in related Chinese Application No. 202080017072.0, with English machine translation (28 pages).

* cited by examiner

500

502: Obtaining information comprising a plurality of vehicle locations of a plurality of vehicles, a plurality of ride orders, and a current time

504: Inputting the obtained information into a trained model that is based on Kullback-Leibler divergence optimization and independent agents under a guidance of a joint policy

506: Generating a plurality of order-dispatching tasks for the plurality of vehicles to fulfill

FIG. 5

MULTI-AGENT REINFORCEMENT LEARNING FOR ORDER-DISPATCHING VIA ORDER-VEHICLE DISTRIBUTION MATCHING

CROSS REFERENCE TO RELATED APPLICATION

This application claims priority to U.S. Provisional Application No. 62/810,860, filed Feb. 26, 2019, and entitled "SYSTEM AND METHOD FOR RIDE ORDER DISPATCHING", which is incorporated herein by reference in its entirety.

TECHNICAL FIELD

The disclosure relates generally to matching ride orders with vehicles, and more specifically, to methods and systems for dispatching orders to vehicles based on multi-agent reinforcement learning.

BACKGROUND

Modern large-scale ride-hailing systems have become feasible and promising due to the boom of mobile internet. These ride-hailing systems allow passengers to book routes with smartphones and match available vehicles to them based on intelligent algorithms. These ride-hailing systems improve the efficiency of the transportation system. A key point in ride-hailing systems is how to dispatch orders to vehicles to make the system work more efficiently and generate more impact. The algorithm used by the decision maker is critical for finding suitable matches because the result of order-dispatching has direct influences on the platform efficiency and income.

Improving the efficiency of dispatching orders to vehicles is a research hotspot in online ride-hailing systems. Most of the existing solutions for order-dispatching are centralized controlling, which requires to consider all possible matches between available orders and drivers. For large-scale ride-sharing platforms, there are thousands of vehicles and orders to be matched every second, which has a very high computational cost.

GPS-based order-dispatching systems may be used to enhance the accuracy, communications, and productivity of taxi dispatching. However, these systems do not offer detailed dispatching algorithms, which means these platforms are more like information sharing platforms, helping vehicles choose orders to serve by offering orders information. Other automatic order-dispatching methods focus on reducing the pick-up distance or waiting time by finding the nearest orders. These methods usually fail to reach a high success rate on order-dispatching and ignore many potential orders in the waiting list which may be more suitable for vehicles. Centralized control dispatching based on combinatorial optimization may also be used. While this method is simple, the requirement of computing all available order-vehicle matches may have very high computational costs in a large-scale taxi-order-dispatching situation. Moreover, it requires appropriate feature engineering. Thus, it greatly increases the system implementation difficulty and human efforts of applying the method in a practical situation.

NTuCab is a collaborative multi-agent taxi dispatching system which attempts to increase customer satisfaction more globally, and can dispatch multiple orders to taxis in the same geographical regions. However, NTuCab is based on the assumption that it is not feasible to compute the shortest-time path for each of a possibly large number of available taxis nearby a customer location since it is computationally costly. While NTuCab achieves an improvement in reducing the wait time and taxi cruising time, it is a computationally costly method.

SUMMARY

Various embodiments of the specification include, but are not limited to, systems, methods, and non-transitory computer readable media for ride order-dispatching.

In various implementations, a method may include obtaining information. The obtained information may include a plurality of vehicle locations of a plurality of vehicles, a plurality of ride orders, and a current time. The method may further include inputting the obtained information into a trained model. The trained model may be based on Kullback-Leibler divergence optimization and independent agents under a guidance of a joint policy. The method may further include generating a plurality of order-dispatching tasks for the plurality of vehicles to fulfill.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining information. The obtained information may include a plurality of vehicle locations of a plurality of vehicles, a plurality of ride orders, and a current time. The operations may further include inputting the obtained information into a trained model. The trained model may be based on Kullback-Leibler divergence optimization and independent agents under a guidance of a joint policy. The operations may further include generating a plurality of order-dispatching tasks for the plurality of vehicles to fulfill.

Yet another aspect of the present disclosure is directed to a non-transitory computer-readable storage medium configured with instructions executable by one or more processors to cause the one or more processors to perform operations. The operations may include obtaining information. The obtained information may include a plurality of vehicle locations of a plurality of vehicles, a plurality of ride orders, and a current time. The operations may further include inputting the obtained information into a trained model. The trained model may be based on Kullback-Leibler divergence optimization and independent agents under a guidance of a joint policy. The operations may further include generating a plurality of order-dispatching tasks for the plurality of vehicles to fulfill.

In some embodiments, a grid-world representing a real world geographical area may be obtained. The grid-world may include a plurality of grid cells representing a plurality of order-dispatching regions. Each vehicle location of the plurality of vehicle locations may include a grid cell in the grid-world.

In some embodiments, a plurality of states for the plurality of vehicles may be obtained. Each state may include a grid cell in the grid-world, a number of idle vehicles in the grid cell, a number of ride orders in the plurality of ride orders, and a distribution of ride orders in the grid cell.

In some embodiments, the plurality of order-dispatching tasks may be generated by selecting ride orders from the plurality of ride orders in the plurality of states.

In some embodiments, each selected ride order may include the grid cell from the corresponding state, a target grid cell, a ride duration, and a price.

In some embodiments, the trained model may be based on an action selection Q-learning network.

In some embodiments, the action selection Q-learning may use biased strategy Boltzman exploration to balance exploitation and exploration.

In some embodiments, the Kullback-Leibler divergence may be optimized by minimizing a divergence between a distribution of vehicles and a distribution of ride orders.

In some embodiments, the trained model may be trained using centralized learning.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 5 illustrates a flowchart of an example method for ride order-dispatching, according to various embodiments of the present disclosure.

DETAILED DESCRIPTION

Figure 1:
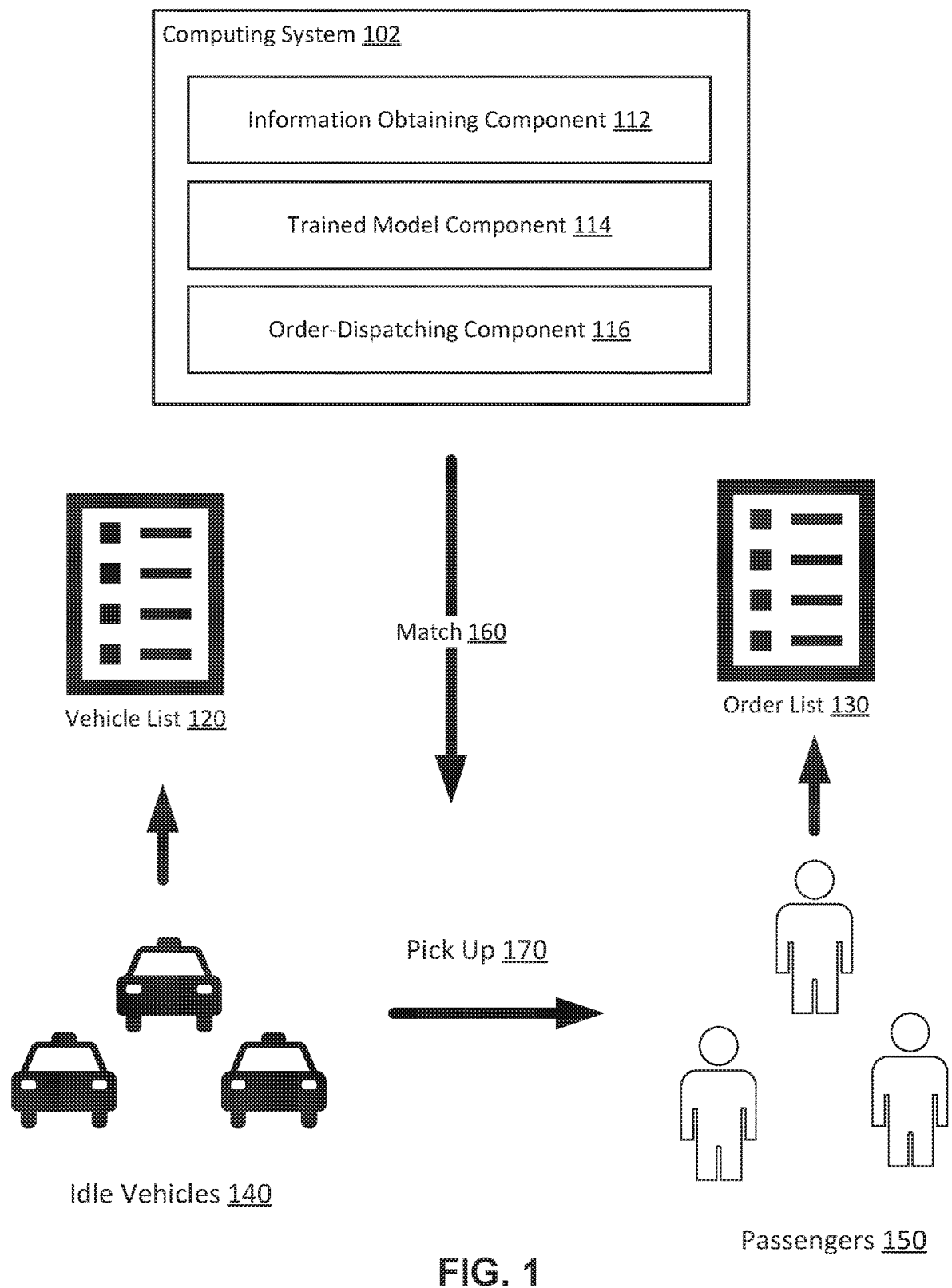
FIG. 1 illustrates an example environment for ride-hailing order-dispatching, in accordance with various embodiments.

Various embodiments will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The approaches disclosed herein improve functioning of multi-agent reinforcement learning methods and computing systems for order-dispatching via matching the distribution of orders and vehicles. The disclosed methods and systems may utilize central learning and decentralized execution in order to improve large-scale order-dispatching. All agents may work independently with the guidance from an evaluation of the joint policy since there is no need for communication or explicit cooperation between agents. Kullback-Leibler (KL) divergence optimization may be used at each time step to speed up the learning process and to balance the vehicles (supply) and orders (demand).

The general strategies of automatic order-dispatching systems are to minimize the waiting time and taxi cruising time through route planning or matching the nearest orders and vehicles. In some embodiments, the order-dispatching problem may be solved by leverage combinatorial optimization to improve the success rate of order-dispatching. Combinatorial optimization may provide significant improvements, however, it suffers from high computational cost, and strongly relies on appropriate feature engineering. Additionally, these general strategies are myopic: they may find suitable matches in the current stage, but ignore the potential future impact.

Multi-agent reinforcement learning (MARL) may be applied in domains like collaborative decision support systems. MARL requires the agents to learn to cooperate with others, unlike single agent reinforcement learning. It is generally impossible to know other policies since the learning process of all agents is simultaneous. Thus for each agent, the environment is non-stationary. It is problematical to directly apply the independent reinforcement learning methods into the multi-agent environment. There are several approaches proposed to relieve or address this problem, including sharing the policy parameters, training the Q-function with other agents' policy parameters, centralized training and opponent modeling. Additionally, there are also some methods which use explicit communication to offer a relatively stationary environment for peer agents.

The non-stationary problem will be amplified in large-scale multi-agent learning. A method which converts multi-agent learning into a two-player stochastic game by applying mean field theory in multi-agent reinforcement learning may be used to make the problem possible. However, since the mean-field MARL method only takes a mean field on states/actions input into consideration, it ignores the agent interactions. In some embodiments, large-scale multi-agent learning may be used and the interactions between agents may be retained. This allows agents to receive global feedback from the next moments and adjust their strategies in time. A backward stationary learning method may be used to rapidly react to the feedback from the environment.

In some embodiments, a city may be divided into many dispatching regions. Each dispatching region may be controlled in a given distance, which indirectly limits the maximum waiting time. Multi-agent order-dispatching may be modeled into multi-agent learning. A city may be divided into many dispatching areas, and an area may be regarded as an agent. Self-organization techniques may be used to decrease the total waiting time and increase vehicle utilization. Fleet management may use learning and planning methods and combinatorial optimization in order to improve the ADI or decrease the waiting time. However, in the current operational ride-sharing scenarios, it is hard to perform fleet management because it is impossible to force drivers to designated regions. The learning and planning method may be based on an independent MARL method, which ignores the interactions between agents. However, considering the interactions between agents may have a positive impact on making optimal decisions. Interactions between agents may be considered by applying constraints on the joint policies using KL-divergence optimization.

In some embodiments, methods and systems may be used to maximize the accumulated driver income (ADI), i.e., the impact of orders served in one day, and the order response rate (ORR), i.e., the proportion of served orders to the total orders in one day. Matching vehicles with high-price orders can receive high impact at a single order-dispatching stage. However, if the served orders result in the mismatch between the orders and vehicles in the near future, it would harm the overall service quality in terms of ORR and the long-term ADI. In order to find a balance between the long-term ADI and ORR, it is necessary to develop an order-dispatching algorithm which takes the future supply and demand into consideration.

In some embodiments, planning and learning methods based on decentralized multi-agent deep reinforcement learning and centralized combinatorial optimization may be used to optimize the long-term ADI and ORR. The methods may formulate the order-dispatching task into a sequential decision-making problem and treat a vehicle as an agent. However, for centralized approaches, a critical issue is the potential "single point of failure". A failure of the centralized authority control will cause the whole system to fail.

Multiple challenges arise when we apply the MARL to the real-time order-dispatching scenario. Handling the non-stationary environment in MARL is a first major problem. All agents learn policies concurrently, while each individual agent does not know the policies of other agents. The state transition in a multi-agent environment is driven by all agents together, so it is important for agents to have knowledge about other agents' policies. In the order-dispatching scenario, the focus is on the idle status of a vehicle since they are available for order-dispatching. However, as the duration of each order is non-deterministic, compared to the traditional multi-agent scenarios which have deterministic time interval, it is difficult to learn the interactions between agents in successive idle states. This makes many MARL methods including opponent modeling and communication mechanism hard to utilize. A second challenge with applying the MARL is that the number of idle vehicles keeps changing during the whole episode. There will always be some vehicles going offline or online. Thus, the general MARL methods which require fixed agent number cannot be directly applied in such a case.

In some embodiments, a centralized learning and decentralized execution MARL methods and systems may be used to solve the above challenges. The methods and systems may use an extension of Double Q-learning Network with Kullback-Leibler (KL) divergence optimization. The KL-based backward learning optimization may also speed up the agents learning process with the help of others'. In some embodiments, because of the large number of homogeneous agents, only one network may be learned using parameter sharing. The learning experiences may be shared among all agents at the training stage. In some embodiments, an input of deep Q-learning network may consist of a state and selected action in order to address the variant action space. As a result, both ADI and ORR may be increased in various traffic environments. A higher ORR usually means a higher ADI, and maintaining a higher long-term ORR will result in a higher long-term ADI.

FIG. 1 illustrates an example environment 100 for ride-hailing order-dispatching, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

In some embodiments, the environment 100 may be used to execute order-dispatching tasks. The order-dispatching task may be associated with a vehicle service platform (e.g., service hailing, ride sharing). The order dispatching tasks may include matching idle vehicles 140 with passengers 150. Idle vehicles 140 may be included in vehicle list 120. The platform may accept requests for transportation from passengers 150, identify idle vehicles 140 to fulfill the requests, arrange for pick-ups, and process transactions. The requests for transportation from passengers 150 may be included in order list 130. For example, a passenger may use a computing device (e.g., mobile phone, tablet, server, desktop computer, laptop computer) to request transportation from the platform. The computing device may be installed with a software application, a web application, an API, or another suitable interface associated with the platform.

The computing system 102 may receive the request and reply with price quote data and price discount data for one or more trips. When the passenger selects a trip, the computing system 102 may relay trip information to various drivers of idle vehicles 140, for example, by posting the request to mobile phones carried by the drivers. A vehicle driver may accept the posted transportation request. The computing system 102 may send match 160 to the passenger and the vehicle driver. The match 160 may include pick-up location information, fees, passenger information, driver information, and vehicle information. The matched vehicle from idle vehicles 140 may then be dispatched through pick up 170 to the requesting passenger from passengers 150. The fees may include transportation fees and may be transacted among the system 102, the user devices 140, and the vehicles 150. In some embodiments, for each trip, the location of the origin and destination, the price discount information, the fee, and the time can be obtained by the system 102.

The computing system 102 may include an information obtaining component 112, a trained model component 114, and an order-dispatching component 116. The computing system 102 may include other components. In some embodiments, one or more of the computing system 102, the vehicle list 120, and the order list 130 may be located a single device or system. Alternatively, the system 102 the vehicle list 120, and the order list 130 may be located in separate devices. For example, the computing system 102 may compile the vehicle list 120 and the order list 130 as information is obtained. In another example, the computing system 102 may receive the vehicle list 120 and the order list 130 from another computing device (e.g., server). While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 escribed herein may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network. The system 102 above may be installed with appropriate software (e.g., platform program, etc.) and/or hardware (e.g., wires, wireless connections, etc.) to access other devices of the environment 100.

The information obtaining component 112 may be configured to obtain information. The obtained information may include a plurality of vehicle locations of a plurality of vehicles, a plurality of ride orders, and a current time. Obtaining information may include one or more of accessing, acquiring, analyzing, determining, examining, identifying, loading, locating, opening, receiving, retrieving, reviewing, storing, or otherwise obtaining the information. In some embodiments, the plurality of vehicles may be included in idle vehicles 140. In some embodiments, each vehicle of the plurality of vehicles may only serve the surrounding ride orders. As a result, the obtained information may be part of a Partially Observable Markov Decision Process (POMDP) that is used to model an order-dispatching task in a multi-agent setting. In some embodiments, the plurality of ride orders may be requested by passengers 140 and included in order list 130. With the multi-agent settings, the original global order-dispatching task may be decomposed into many local order-dispatching tasks, and transform a high-dimensional problem into multiple low-dimensional problems. In some embodiments, the current time may include a current timestep in a sequential order-dispatching task. The order-dispatching task may be regarded as a sequential decision task, where the goal is to maximize the long-term ADI and ORR in one day.

In some embodiments, the POMDP framework to the multi-agent order-dispatching problem may be formulated as a tuple $\langle S, P, A, R, G, N, \gamma \rangle$, where $S, P, A, R, G, N, \gamma$ represent a sets of states, a state transition probability function, a sets of action spaces, a reward functions, a set of grids (i.e., grid cells), a number of agents and a future reward discount factor respectively. For each agent i (e.g., vehicle i), $S_i \in S$, $A_i \in A$, $R_i \in R$ may represent the state space, action space and reward function respectively, and $G_i \in G$ may represent the grid which the agent is in. The state transition may occur after the decision making. For example, after agents execute their actions, the state $S_t$ of environment at time t may transform to $S_t+1$ at time t+1, and agents may get rewards given by the environment. The main purpose of each agent may be to learn to maximize the cumulative reward $G_{t:T}$ from t to T. The following formula may be used to maximize the cumulative reward.

$$\max G_{t:T} = \max \Sigma \gamma^t r_t(s_t, \alpha_t), \text{ where } \alpha_t \sim \pi_\theta(s_t) \quad (1)$$

In reinforcement learning, the $\pi_\theta(s_t)$ parameterized with $\theta$ represents the policy with respect to the state at time t.

In some embodiments, information obtaining component 112 may be configured to obtain a grid-world representing a real world geographical area. The grid-world may include a plurality of grid cells representing a plurality of order-dispatching regions. Each vehicle location of the plurality of vehicle locations may include a grid cell in the grid-world. For example, a city may be divided into regional dispatch areas. The grid-world may be used to represent the real world and divide the real world into several order-dispatching regions. Each grid cell may represent an individual order-dispatching region which contains some orders and vehicles. Vehicles may be regarded as agents.

In some embodiments, the order-dispatching task may be defined from a mathematical perspective based on the MARL settings. In some embodiments, a plurality of states for the plurality of vehicles may be obtained. Each state may include a grid (i.e., grid cell) in the grid-world, a number of idle vehicles in the grid, a number of ride orders in the plurality of ride orders, and a distribution of ride orders in the grid cell. A state input may be expressed as a four elements tuple, namely, $S=\langle G, N, M, D_{dest} \rangle$. Elements in the tuple may represent the grid index, the number of idle vehicles, the number of valid orders and the distribution of orders' destinations respectively. The distribution of order' destination is a mean over the destination vectors of orders in grid G, which roughly reflects the overall the orders information. In some embodiments, agents (e.g., vehicles) in the same grid share the same state.

In some embodiments, the information obtained by the information obtaining component 112 may include an action input. The action input may be expressed as $A=\langle G_{source}, G_{dest}, T, C \rangle$. Elements in the tuple may represent the source grid index, target grid index, order duration (i.e., ride duration), and price respectively. The set of orders in the grid j at time t may be regarded as the candidate actions of the agent i (e.g., vehicle i). Since agents are homogeneous, agents in grid j share the same action space. In some embodiments, there may be no preexisting order in some regions. In some embodiments under the setting of MARL, agents may need to select orders at each timestep, but some grids may not have orders, so in order to ensure the feasibility and sustainability of the POMDP, some virtual orders may artificially be added whose $G_{source}=G_{dest}$. The price C of these virtual orders may be set to 0. When idle vehicles select these virtual orders, it means they will stay where they are.

In some embodiments, a state transition may occur after timestep T. The agent (e.g., vehicle) which serves one order may migrate to the destination grid given by the taken order after T. T may be defined with the served order duration. Afterwards, the state of the agent may be updated to the newest state with respect to the destination grid. In some embodiments, the order-dispatching task may result in reward. The reward function may determine the direction of optimization, and is very important for reinforcement learning. In some embodiments, the goal of learning may be to find a solution which maximizes the ADI with high ORR. The reward function may be designed to be proportional to the price of each order.

The trained model component 114 may be configured to input obtained information to a trained model. In some embodiments, the trained model may be based on an action selection Q-learning network. A traditional deep Q-learning network accepts a state input and outputs a vector of Q values whose dimension is equal to the dimension of action space.

$$\dim(Q_{(s,A)}) = \dim(A) \quad (2)$$

This equation is correct when the action space is fixed. However, traditional deep Q-learning is problematic when the action space is variable. In the ride sharing setting, for the grid j, the orders produced at time t are always different from the orders produced at other moments. A consistent action space cannot be guaranteed along the whole episode, so it is problematical to regard the orders as an action while ignoring the distribution of the variant action space. In some embodiments, the tuple ⟨ S, α⟩ may be used to a represent the input of the Q-learning. All available state-order pairs may then be evaluated.

Figure 2:
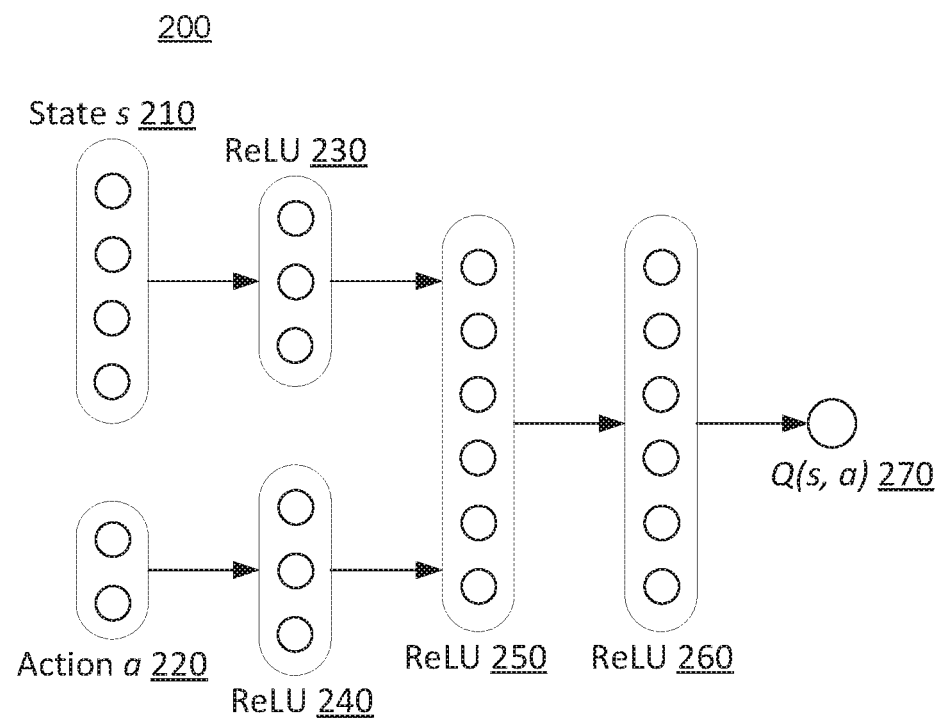
FIG. 2 illustrates an example action selection Q-learning network, in accordance with various embodiments.

FIG. 2 illustrates an example action selection Q-learning network 200, in accordance with various embodiments. The action selection Q-learning network 200 is a Q-learning network with a state-action input. The state-action input may include state s 210 and action a 220. Action a 220 may include an action feature vector. State s 210 may be input into Rectified linear unit (ReLU) 230. ReLUs may be used to rectify data. For example, data may be rectified using an activation function or a ramp function. Action a 220 may be input into ReLU 240. After being rectified, the inputs may be concatenated and input into ReLU 250 and ReLU 260. ReLU 250 and ReLU 260 may serve as two dense layers. The action selection Q-learning network 200 may output scalar value Q(s, α) 270.

For a single agent (e.g., vehicle) i, with Mi available orders, Mi state-action evaluation are required. In the case of N agents, the computational complexity will be O(N·M). To decrease the original complexity to O(c·M), parameter sharing and state sharing may be used, where c is a constant related to the number of grids. From the perspective of agent i, we suppose that $s_t$ denotes the state at time t, $α_t$ denotes the set of orders, then the Bellman Equation in our settings can be expressed as:

$$Q(s_t, α_t) = αQ(s_t, α_t) + (1-α)[r_t + γ \cdot \mathbb{E}_{t+1} \sim π(s_{t+1})[Q(s_{t+1}, α_{t+1})]], \quad (3)$$

where $γ \in [0, 1]$ is the discount factor, α is the step size. The value of the next timestep is an expectation of all available state-order pairs:

$$\mathbb{E}_{a_{t+1} \sim π(s_{t+1})}[Q(s_{t+1}, a_{t+1})] = \sum_{π(a_{t+1}|s_{t+1})} π(a_{t+1}|s_{t+1})Q(s_{t+1}, a_{t+1}) \quad (4)$$

In some embodiments, the action selection Q-learning may use biased strategy Boltzmann exploration to balance exploitation and exploration. The Q values related to the same order sets may be converted into a biased strategy Boltzmann exploration:

$$π(a_t^j | s_t) = \frac{e^{Q(s_t, a_t^j)/T}}{\sum_{a_t^j \in A_i} e^{Q(s_t, a_t^j)/T}}, \quad (5)$$

where T is the temperature to balance the exploitation and exploration.

Returning to FIG. 1, the trained model obtained by the trained model component 114 may be based on Kullback-Leibler divergence optimization and independent agents under a guidance of a joint policy. In some embodiments, the Kullback-Leibler divergence optimization may be used to minimize a divergence between a distribution of vehicles and a distribution of ride orders. In some embodiments, the independent agents may not directly communicate with each other. All of the agents may work independently with the guidance of a joint policy. The trained model may apply constraints to the joint policy in order to consider interactions between the independent agents. In some embodiments, learning multi-agent communication may be used in multi-agent systems where the environment is non-stationary for each agent. Most learning multi-agent communication requires a fixed agent number or observations from other agents before making decisions. In the order-dispatching case, explicit communication between agents is often time-consuming and difficult to adapt in such a scenario.

Figure 3:
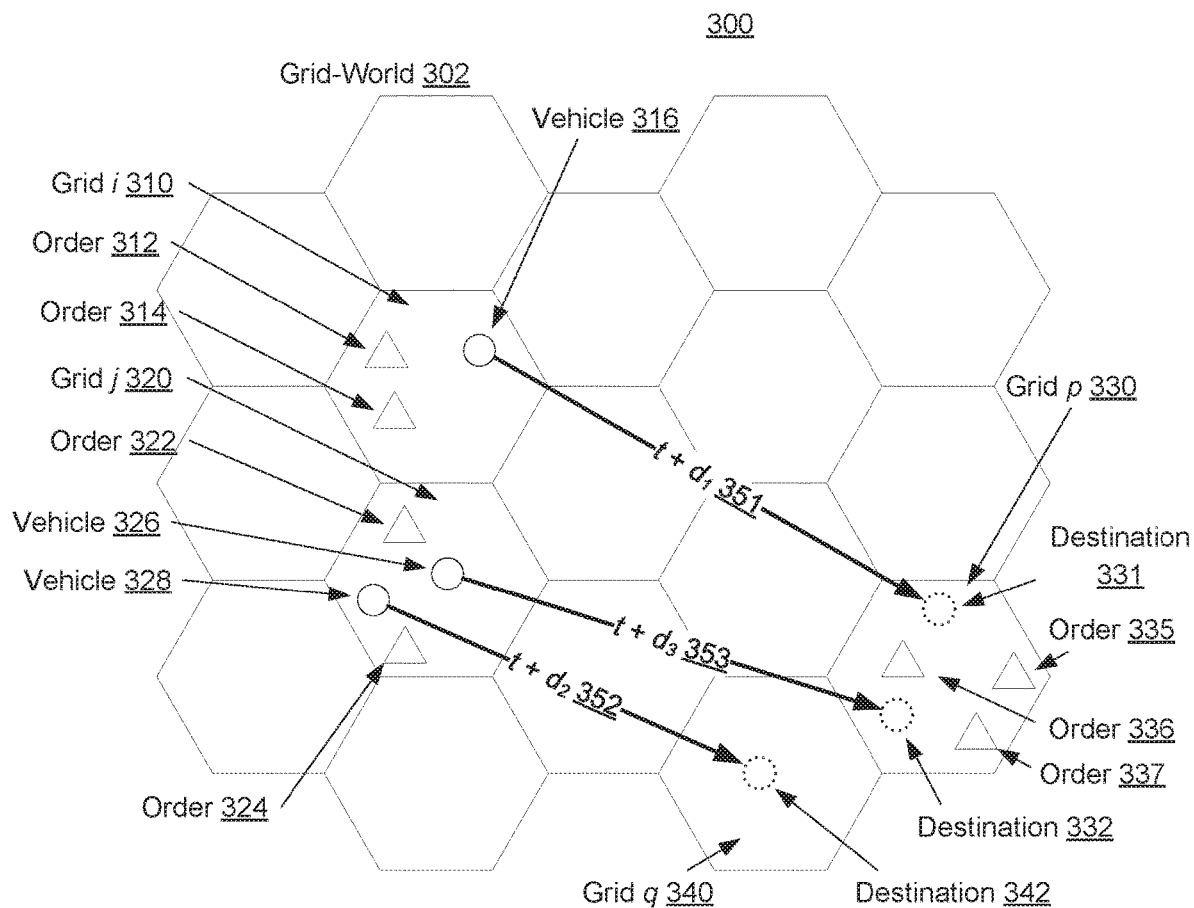
FIG. 3 illustrates exemplary grid-based order-dispatching process, in accordance with various embodiments.

FIG. 3 illustrates exemplary grid-based order-dispatching process 300, in accordance with various embodiments. Grid-based order-dispatching 300 may include grid-world 302. For example, the grid-world 302 may include the grid-world representing a real world geographical area obtained by information obtaining component 112 of FIG. 1. The grid-world 302 may include grid i 310, grid j 320, grid p 330, nd grid q 340. Grid i 310 may include orders 312 and 314 represented by triangles, and vehicle 316 represented by a circle. Grid j 320 may include orders 322 and 324, and vehicles 326 and 328. Grid p 330 may include destinations 331 and 332, nd orders 335, 336 and 337. Grid p 30 may include destination 342

The order-dispatching process of each grid at time t is shown. Vehicles serving different orders may be assigned to different grids. Different orders may have different durations of d, so the vehicles will arrive at the destination grids at different time. Vehicle 316 may arrive at destination 331 at time t+$d_1$ 351. Vehicle 326 may arrive at destination 333 at time t+$d_3$ 353. Vehicle 328 may arrive at destination 342 at time t+$d_2$ 352. As a result, it may be hard to form continuous interactions and communication between vehicles. There may also be high computational costs, especially in large-scale settings. For these reasons, the communication mechanism or learning of others' policies may not be applied in some embodiments.

Returning to FIG. 1, in some embodiments, the trained model used by the trained model component 114 may be trained using centralized learning. The centralized training method may use KL divergence optimization to optimize the agents' joint policy and try to match the distribution of vehicles with the distribution of orders. The goals of the trained model may be to (1) maximize the long horizontal ADI; (2) optimize the ORR. If there are always enough vehicles in the dispatching grid, it is easy to decrease the rate of idle vehicles and improve the order response rate. Because ride orders are received from passengers, the distribution of orders cannot be control. The goals of the trained model may be reformulated as making the order and vehicle distribution as similar as possible through finding feasible order-vehicle matches. An independent learning process with centralized KL divergence optimization may be used without requiring explicit cooperation or communication between agents.

The vehicle instructions component 116 may be configured to generate a plurality of order-dispatching tasks for the plurality of vehicles to fulfill. In some embodiments, the plurality of order-dispatching tasks may be generated by selecting ride orders from the plurality of ride orders in the plurality of states. In some embodiments, each selected ride order may include the grid from the corresponding state, a target grid, an order duration, and a price. Supposing at time t, the agents (e.g., vehicles) find a feasible order set $o'_t$ by executing their policies:

$$o'_t = \{o_t^j | o_t^j \sim π_t(s^j)\}, \quad (6)$$

In some embodiments, an optimal $o'_t$ may be found. Focusing on grid j 320 of FIG. 3, the policy $π_{θ_j}$ at time t may be parameterized by $θ_j$. After all policies have been executed, the newest distribution of vehicles $D_{t+1}^v$ and the newest distribution of orders is $D_{t+1}^o$ may be obtained. The KL divergence from $D_{t+1}^v$ to $D_{t+1}^o$ shows the margin between the joint policy Π at time t and $D_{t+1}^o$, so the KL optimization is actually finding a joint policy Π which has a minimal margin:

$$\Pi = \arg_{\pi_t} \min D_{KL}(D_{t+1}^o \| D_{t+1}^v(\pi_\theta)), \quad (7)$$

where $\Pi = \{\pi_{\theta_j} | j=1, \ldots, N\}$. For convenience, $D_{KL}(D_{t+1}^o \| D_{t+1}^v(\Pi))$ may be replaced with $D_{KL}$. The KL divergence from the distribution of vehicles to the distribution of orders may be decreased to balance the demand and supply at each order-dispatching grid. Formally, the KL policy optimization may be written as:

$$\min_\theta \mathcal{L} = \|Q_\theta(s, a) - Q^*\|_2 \quad (8)$$

$$\text{s.t. } D_{KL} \leq \beta, \quad (9)$$

where $\beta \in \mathbb{R}$. Then the objective function may be expressed as $$\min_\theta \mathcal{L} = \|Q_\theta(s, a) - Q^*\|_2 + \lambda D_{KL} \quad (10)$$

where $Q^*$ is the target Q-value, $\lambda \in \mathbb{R}$ parameterizes the contribution of KL item. To formulate the relationship between $\min \mathcal{L}$ and $\theta_j$, some definitions of notations may be made in advance. Considering that there is N grids in total, $n_{t+1}^i$ represents the number of idle vehicles in grid i at time step t+1, which may be formulated as $n_{t+1}^i = \Sigma_{j=1}^N c_t^j \cdot \pi_{j \to i}$, where $c_t^j$ represents the idle driver number at last time step t, $\pi_{j \to i}$ represents the probability of dispatching orders which from grid j to grid i to idle vehicles at time t, and these vehicles will arrive at grid i at time t+1. $q_{t+1}^j$ is the rate of idle vehicles in grid j which may be formulated into $q_{t+1}^j = n_{t+1}^j / \Sigma_{k=1}^N n_{t+1}^k \cdot p_{t+1}^i$ represents the rate of orders in grid i at time t+1 here. Using chain rule, the gradient of $D_{KL}$ to θ may be decomposed as follows:

$$\nabla_{\theta_j} D_{KL} = \nabla_{\pi_j} D_{KL} \cdot \nabla_{\theta_j \pi_j} = \quad (11)$$

$$-\left( \sum_{i=1}^N P_{t+1}^i \nabla_{\pi_j} \log \frac{q_{t+1}^i}{p_{t+1}^i} \right) \cdot \nabla_{\theta_j \pi_j} = \sum_{i=1}^N P_{t+1}^i \nabla_{\pi_j} \log \frac{1}{q_{t+1}^i} \cdot \nabla_{\theta_j \pi_j} =$$

$$\sum_{i=1}^N P_{t+1}^i \left[ \nabla_{\pi_j} \log \sum_{k=1}^N \sum_{l=1}^N \pi_{l \to k} c_t^l - \nabla_{\pi_j} \log \sum_{k=1}^N \pi_{l \to k} c_t^j \right] \cdot \nabla_{\theta_j \pi_j} =$$

$$\sum_{i=1}^N P_i \left[ \frac{\nabla_{\pi_j} \sum_{k=1}^N \pi_{j \to k} \left( c_t^j + \sum_{l \neq 1}^N c_t^l \right)}{\sum_{k=1}^N \sum_{l=1}^N \pi_{l \to k} c_t^l} - \frac{\nabla_{\pi_j} \sum_{k=1}^N \pi_{j \to k} c_t^j}{\sum_{k=1}^N \pi_{j \to k} c_t^j} \right].$$

$$\nabla_{\theta_j \pi_j} =$$

$$c_t^j \sum_{i=1}^N P_{t+1}^i \left[ \frac{1}{\sum_{k=1}^N \sum_{l=1}^N \pi_{l \to k} c_t^l} - \frac{1}{\sum_{k=1}^N \pi_{j \to k} c_t^j} \right] \cdot \nabla_{\theta_j \pi_j} =$$

$$c_t^j \sum_{i=1}^N P_{t+1}^i \left[ \frac{1}{N_{vehicle}} - \frac{1}{n_{t+1}^i} \right] \cdot \nabla_{\theta_j \pi_j}$$

where $$N_{vehicle} = \sum_{j=1}^N n_{t+1}^j.$$

The gradient of $\pi_j$ to $\theta_j$ is $\nabla_{Q_j(s,\alpha)} \pi_j(\alpha|s) \cdot \nabla_\theta Q(s,\alpha)$. Using $\delta = \|Q - Q^*\|_2$, then the final gradient of $\mathcal{L}_\theta(s, a)$ to θ is calculated as:

$$\nabla_{\theta_j} \mathcal{L} = \nabla_{\theta_j} \delta + \lambda \nabla_{\theta_j} S \quad (12)$$

Figure 4:
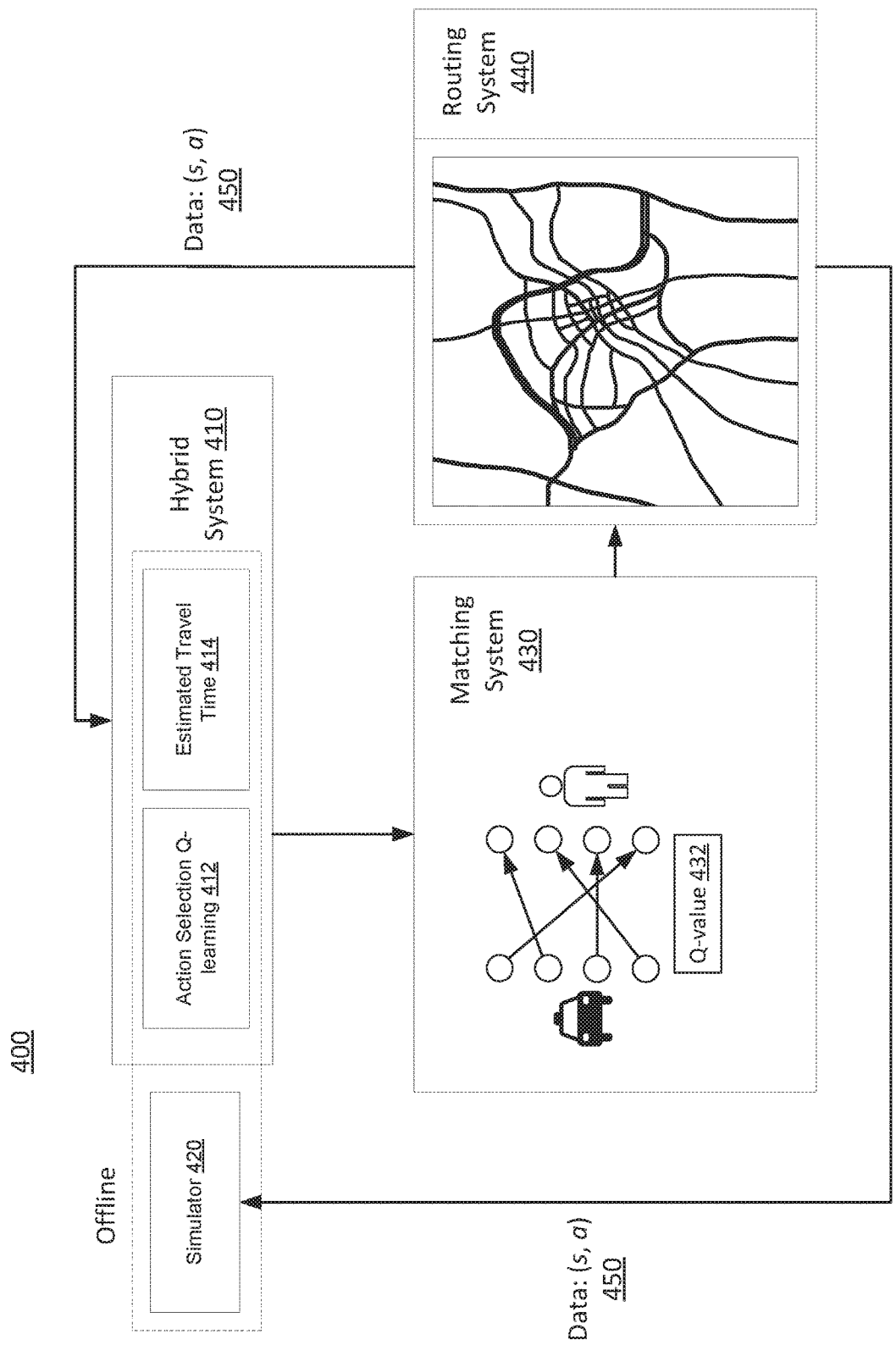
FIG. 4 illustrates an example environment for real-time ride-order dispatching, in accordance with various embodiments.

FIG. 4 illustrates an example environment 400 for real-time ride-order dispatching, in accordance with various embodiments. The example environment 400 may include a hybrid system 410, a simulator 420, a matching system 430, and a routing system 440. The hybrid system 410 may include action selection Q-learning (ASQ) 412 and estimated travel time 414. The ASQ 412 may be trained offline in the simulator 420 and interact with simulator 420 periodically. In some embodiments, the hybrid system 410 may include routing planning techniques and estimating time of arrival (ETA). Each order's travel time may be obtained via the ETA model. The travel time may be dynamic and depend on current traffic and route conditions. Coordinate position information may be taken into consideration in the ETA model.

In some embodiments, estimate travel time techniques may be adapted to incorporate action selection Q-learning. For example, the duration time of each order may be regarded as one of the already known order features. The grid-world map may be adopted to simplify the real-world environment and replace coordinate position information with grid information. Vehicles in the same grid may share the same setting, and this isomorphic setting may ignore the intra-grid information.

In some embodiments, matching system 430 may obtain Q-value 432 from hybrid system 410. Matching system 430 may output ⟨vehicle, order⟩ matches to routing system 40. In each time slot, the goal of the real-time order dispatch algorithm may be to determine the best matching between vehicles and orders in the matching system 430 and plan a routine for drivers to serve the orders. The principle of Matching System may be formulated as:

$$\arg\max_{a_{ij}} \sum_{i=0}^m \sum_{j=0}^m Q(i, j) a_{ij} \quad (13)$$

$$\text{s.t.} \sum_{i=0}^m a_{ij} = 1, j = 1, 2, 3 \ldots, n$$

$$\sum_{j=0}^n a_{ij} = 1, i = 1, 2, 3 \ldots, m \quad (14)$$

where $$a_{ij} = \begin{cases} 1, & \text{if order } j \text{ is assigned to driver } i \\ 0, & \text{if order } i \text{ is not assigned to driver } i \end{cases}$$

where $i \in [1, 2, \ldots, m]$ and $j \in [1, 2, \ldots, n]$ present all idle drivers and available orders at each time step respectively. Q(i, j) may be output from hybrid system 410 and represent the action-value function driver i performing an action of serving order j. The constraints in Equation 14 may guarantee that each driver will select one available real orders or doing nothing while each order will be assigned to one driver or stay unserved at each time step.

In some embodiments, matching system 430 may be implemented using Kuhn-Munkres (KM) algorithm. Equation 13 may be formulated as a bipartite graph matching problem where drivers and orders are presented as two set of nodes. Each edge between order i and driver j may be valued with Q(i, j), and the best matches may be found using KM algorithm. When it is assumed that there is no difference between the drivers in a same grid, the KM algorithm will degenerate into a sorting algorithm. The top m orders with the highest Q(i, j) values may be selected.

In some embodiments, the matching pairs of orders and vehicles selected by the matching system 430 may be delivered with coordinate information to the routing system 440. The routing system 440 may be equipped with route planning techniques which may allow drivers to serve the orders. Data: (s, α) 450 may be given as feedback (e.g., a reward) to the hybrid system 410 and the simulator 420 in order to help the whole training system achieve better performance.

FIG. 5 illustrates a flowchart of an example method 500 for ride order-dispatching, according to various embodiments of the present disclosure. The method 500 may be implemented in various environments including, for example, the environment 100 f FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 502, information may be obtained. The information may include a plurality of vehicle locations of a plurality of vehicles, a plurality of ride orders, and a current time. At block 504, the obtained information may be input into a trained model. The trained model may be based on Kullback-Leibler divergence optimization and independent agents under a guidance of a joint policy. At block 506, a plurality of order-dispatching tasks may be generated for the plurality of vehicles to fulfill.

Figure 6:
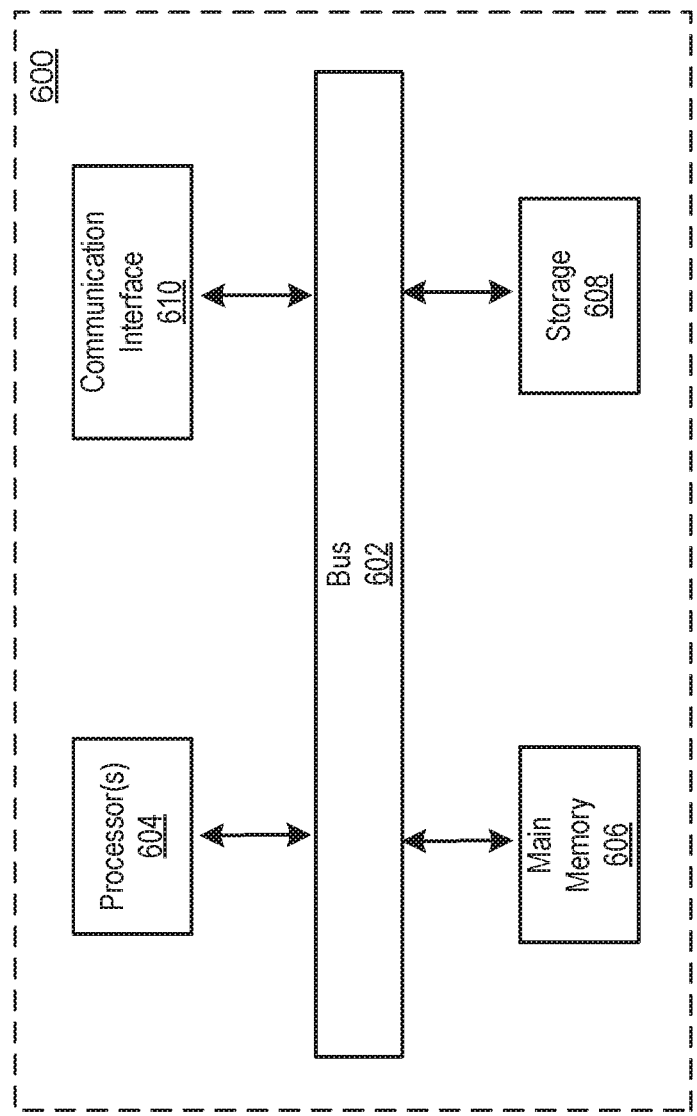
FIG. 6 is a block diagram that illustrates a computer system upon which any of the embodiments described herein may be implemented.

FIG. 6 is a block diagram that illustrates a computer system 600 upon which any of the embodiments described herein may be implemented. For example, the computing system 600 may be used to implement the computing system 102 shown in FIG. 1. As another example, the processes/methods shown in FIGS. 2-5 and described in connection with this figure may be implemented by computer program instructions stored in main memory 606. When these instructions are executed by processor(s) 604, they may perform the steps as shown in FIGS. 2-5 and described above. In alternative embodiments, hard-wired circuitry may be used in place of or in combination with software instructions. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method for ride order-dispatching, comprising:
   training a Q-learning network that minimizes vehicle waiting time and traveling time in a ride-sharing platform, wherein the training comprises using Kullback-Leibler divergence optimization and independent agents under a guidance of a joint policy, and the Q-learning network represents the joint policy;
   obtaining information comprising a plurality of vehicle locations of a plurality of vehicles, pending ride orders, and a current time;
   inputting the obtained information as a state into the trained Q-learning network to obtain recommended vehicle actions, wherein the vehicle actions comprise accepting an order or staying idle, wherein:
      the trained Q-learning network adds a virtual order when a number of the pending orders is zero, and
      when a vehicle's recommended vehicle action include accepting the virtual order, the vehicle stays idle; and
   generating a plurality of order-dispatching tasks for the plurality of vehicles to fulfill.

2. The method of claim 1, wherein the method further comprises:
   obtaining a grid-world representing a real world geographical area, wherein the grid-world comprises a plurality of grid cells representing a plurality of order-dispatching regions, wherein each vehicle location of the plurality of vehicle locations comprises a grid in the grid-world.

3. The method of claim 2, wherein the method further comprises:
   obtaining a plurality of states for the plurality of vehicles, wherein each state comprises a grid cell in the grid-world, a number of idle vehicles in the grid cell, a number of ride orders in the grid cell, and a distribution of ride orders in the grid cell.

4. The method of claim 3, wherein the plurality of order-dispatching tasks are generated by selecting ride orders from the plurality of ride orders in the plurality of states.

5. The method of claim 4, wherein each selected ride order comprises the grid cell from the corresponding state, a target grid cell, a ride duration, and a price.

6. The method of claim 1, wherein the Q learning network uses biased strategy Boltzmann exploration to balance exploitation and exploration.

7. The method of claim 1, wherein the Kullback-Leibler divergence optimization comprises minimizing a divergence between a distribution of vehicles and a distribution of ride orders.

8. The method of claim 1, wherein the Q learning network is trained using centralized learning.

9. A system for ride order-dispatching, comprising one or more processors and one or more non-transitory computer-readable memories coupled to the one or more processors and configured with instructions executable by the one or more processors to cause the system to perform operations comprising:
   training a Q-learning network that minimizes vehicle waiting time and traveling time in a ride-sharing platform, wherein the training comprises using Kullback-Leibler divergence optimization and independent agents under a guidance of a joint policy, and the Q-learning network represents the joint policy;
   obtaining information comprising a plurality of vehicle locations of a plurality of vehicles, pending ride orders, and a current time;
   inputting the obtained information as a state into the trained Q-learning network to obtain recommended vehicle actions, wherein the vehicle actions comprise accepting an order or staying idle, wherein:
      the trained Q-learning network adds a virtual order when a number of the pending orders is zero, and
      when a vehicle's recommended vehicle action include accepting the virtual order, the vehicle stays idle; and
   generating a plurality of order-dispatching tasks for the plurality of vehicles to fulfill.

10. The system of claim 9, wherein the operations further comprise:
    obtaining a grid-world representing a real world geographical area, wherein the grid-world comprises a plurality of grid cells representing a plurality of order-dispatching regions, wherein each vehicle location of the plurality of vehicle locations comprises a grid in the grid-world.

11. The system of claim 10, wherein the operations further comprise:
    obtaining a plurality of states for the plurality of vehicles, wherein each state comprises a grid in the grid-world, a number of idle vehicles in the grid, a number of ride orders in the plurality of ride orders, and a distribution of ride orders in the grid cell.

12. The system of claim 11, wherein the plurality of order-dispatching tasks are generated by selecting ride orders from the plurality of ride orders in the plurality of states.

13. The system of claim 12, wherein each selected ride order comprises the grid cell from the corresponding state, a target grid cell, a ride duration, and a price.

14. The system of claim 9, wherein the Q-learning network uses biased strategy Boltzmann exploration to balance exploitation and exploration.

15. The system of claim 9, wherein the Kullback-Leibler divergence optimization comprises minimizing a divergence between a distribution of vehicles and a distribution of ride orders.

16. A non-transitory computer-readable storage medium configured with instructions executable by one or more processors to cause the one or more processors to perform operations comprising:
    training a Q-learning network that minimizes vehicle waiting time and traveling time in a ride-sharing platform, wherein the training comprises using Kullback-Leibler divergence optimization and independent agents under a guidance of a joint policy, and the Q-learning network represents the joint policy;
    obtaining information comprising a plurality of vehicle locations of a plurality of vehicles, pending ride orders, and a current time;
    inputting the obtained information as a state into the trained Q-learning network to obtain recommended vehicle actions, wherein the vehicle actions comprise accepting an order or staying idle, wherein:
the trained Q-learning network adds a virtual order when a number of the pending orders is zero, and when a vehicle's recommended vehicle action include accepting the virtual order, the vehicle stays idle; and
generating a plurality of order-dispatching tasks for the plurality of vehicles to fulfill.

17. The non-transitory computer-readable storage medium of claim 16, wherein the operations further comprise:
obtaining a grid-world representing a real world geographical area, wherein the grid-world comprises a plurality of grid cells representing a plurality of order-dispatching regions, wherein each vehicle location of the plurality of vehicle locations comprises a grid in the grid-world.

18. The non-transitory computer-readable storage medium of claim 17, wherein the operations further comprise:
obtaining a plurality of states for the plurality of vehicles, wherein each state comprises a grid in the grid-world, a number of idle vehicles in the grid, a number of ride orders in the plurality of ride orders, and a distribution of ride orders in the grid cell.

19. The non-transitory computer-readable storage medium of claim 16, wherein the Kullback-Leibler divergence optimization comprises minimizing a divergence between a distribution of vehicles and a distribution of ride orders.

\* \* \* \* \*